United States Patent
Mildner et al.

(10) Patent No.: US 8,651,563 B2
(45) Date of Patent: Feb. 18, 2014

(54) BEARING STRUCTURE ARRANGEMENT OF A MOTOR VEHICLE BODY

(75) Inventors: Udo Mildner, Limburg (DE); Lothar Teske, Aschaffenburg (DE)

(73) Assignee: GM Global Technology Operations LLC, Detroit, MI (US)

( * ) Notice: Subject to any disclaimer, the term of this patent is extended or adjusted under 35 U.S.C. 154(b) by 10 days.

(21) Appl. No.: 13/447,370

(22) Filed: Apr. 16, 2012

(65) Prior Publication Data

US 2012/0261951 A1 Oct. 18, 2012

(30) Foreign Application Priority Data

Apr. 16, 2011 (DE) .......................... 10 2011 017 341

(51) Int. Cl.
*B62D 25/08* (2006.01)

(52) U.S. Cl.
USPC .................. 296/203.02; 296/193.09; 296/192

(58) Field of Classification Search
USPC .................... 296/203.01–203.03, 193.09, 192
See application file for complete search history.

(56) References Cited

U.S. PATENT DOCUMENTS

| | | | |
|---|---|---|---|
| 4,270,793 A | | 6/1981 | Harasaki et al. |
| 4,883,309 A | * | 11/1989 | Miyazaki et al. ........ 296/193.09 |
| 5,269,585 A | * | 12/1993 | Klages et al. ................ 296/205 |
| 6,299,237 B1 | | 10/2001 | Benz et al. |
| 6,389,697 B1 | | 5/2002 | Benoit et al. |
| 6,572,180 B2 | * | 6/2003 | Kim .......................... 296/203.02 |
| 7,407,220 B2 | * | 8/2008 | Kanagawa et al. ...... 296/187.09 |
| 2008/0296934 A1 | | 12/2008 | Shishido |

FOREIGN PATENT DOCUMENTS

| | | |
|---|---|---|
| DE | 4329050 A1 | 3/1995 |
| DE | 19926352 A1 | 12/2000 |
| DE | 10335034 A1 | 3/2005 |
| DE | 102008027168 A1 | 12/2009 |
| DE | 102009042064 A1 | 3/2011 |
| EP | 0671312 A1 | 9/1995 |
| GB | 1547898 | 6/1979 |
| GB | 2049567 A | 12/1980 |
| JP | 2005153800 A | 6/2005 |

OTHER PUBLICATIONS

German Patent Office, German Search Report dated Jan. 10, 2012 for German Application No. 102011017341.2.
UK IPO, British Search Report for Application No. 1205815.2, dated Jul. 5, 2012.

* cited by examiner

*Primary Examiner* — Dennis Pedder
(74) *Attorney, Agent, or Firm* — Ingrassia Fisher & Lorenz, P.C.

(57) ABSTRACT

A bearing structure arrangement of a motor vehicle body is provided with a side panel structure adjoining a bulkhead, and a linking component secured thereto for accommodating a frame rail section located upstream from the side panel structure in the traveling direction. The linking component facing the frame carrier section includes, but is not limited to an attachment profile corresponding with the profile cross section of the frame rail section.

14 Claims, 9 Drawing Sheets

BEARING STRUCTURE ARRANGEMENT OF A MOTOR VEHICLE BODY

CROSS-REFERENCE TO RELATED APPLICATION

This application claims priority to German Patent Application No. 10 2011 017 341.2, filed Apr. 16, 2011, which is incorporated herein by reference in its entirety.

TECHNICAL FIELD

The technical field relates to a bearing structure arrangement of a motor vehicle body, in particular the arrangement and attachment of a frame rail section located upstream relative to the vehicle bulkhead, for example a wheel suspension strut, to a side panel structure of the motor vehicle body.

BACKGROUND

Integral vehicle body frames exhibit at least two upper side frame rails of a front end, which are to be structurally joined at the front to a passenger cabin of the body, adjoining a side panel structure. The frame rails can here be secured directly to an A-column or a hinge pillar adjoining the latter from below.

In order to provide a wheel housing for the front wheels, the frame rail section located upstream from the bulkhead is vertically offset relative to an upper frame rail or wheel suspension strut that extends from the hinge pillar in the longitudinal direction of the vehicle opposite the traveling direction and lies in the area of the passenger cabin. In particular, to absorb and transfer the mechanical loads and forces that arise, for example during a collision, the connection between frontal frame rail segments, i.e., those located in front of the bulkhead, and the side panel structure must satisfy prescribed load requirements. Of course, correspondingly thick-walled steel plates can be used to provide sufficiently stable structural connections in the motor vehicle body construction.

However, in order to reduce fuel consumption and improve the $CO_2$ balance of motor vehicles associated therewith, it is desirable to improve the vehicle weight while retaining, if not even improving, the mechanical load limits, for example with respect to the torsional rigidity and stability of a motor vehicle body. In addition, there is a constant requirement to improve the structural behavior of the motor vehicle body in terms of passenger and pedestrian protection, as well as with respect to durability.

For example, DE 43 29 050 C2 discloses a body in white, in which a respective hinge pillar comprising the lower portion of an A-column is connected with a frame rail that runs toward the front from the hinge pillar and is labeled as a wheel suspension strut. The wheel suspension strut is here welded via weld faces to a bulkhead side panel that forms a wheel housing and a door opening frame that comprises the outer skin of the motor vehicle.

While the individual components are here usually welded and bonded together via spot welding, corresponding holes must be furnished in the wheel suspension strut for this purpose, so that access can be provided to the underlying components by means of a welding tool. The disadvantage here on the one hand is that a portion of the wheel suspension strut covered by the side panel must be sealed off. Since a corresponding seal weld extends along the entire weld face, it is relatively long. On the other hand, this weld seam must be checked and examined for tightness before welding on an outer wheel suspension strut, since even just a regionally leaky weld seam might allow water into the hinge pillar, and hence into the vehicle interior, over the long-term operation of the vehicle.

In addition, an opening in the wheel suspension strut or frame rail to be provided for access with the welding tool weakens the structure of such bearing structure components. Instead of spot-welding, it is basically conceivable to connect the outer wheel suspension struts with the side panel structure or reinforcement of a hinge pillar situated under the latter, for example via gas-shielded welding, or via MIG or Mag welding, in particular in a $CO_2$-welding process. However, the heat generated during such a welding process would damage a zinc coating of the bearing structure components, for example, thereby increasing the risk of corrosion precisely in the vicinity of the weld seam in some instances.

Therefore, at least one object is to provide an improved bearing structure arrangement in the transitional area between the front frame rail and a side panel structure lying in the vicinity of the bulkhead. The bearing structure arrangement is here to be characterized by a streamlined manufacturing process as well as an improved stability and torsional rigidity. It is here further provided that the wheel suspension struts or front frame rail section be secured to bearing structure components adjoining them via spot welding, but without having to furnish individual openings in the frame rail section for the welding process. In addition, other objects, desirable features and characteristics will become apparent from the subsequent summary and detailed description, and the appended claims, taken in conjunction with the accompanying drawings and this background.

SUMMARY

The claimed bearing structure arrangement of a motor vehicle body exhibits at least one side panel structure adjoining a motor vehicle bulkhead, as well as a linking component that is secured or has yet to be secured thereto. The side panel structure is here typically made up of the hinge pillar, which if necessary can be provided with a reinforcing profile. In addition, the side panel structure can also exhibit a door opening frame, which is to be attached to the hinge pillar.

The linking component extends at least regionally toward the front on the side panel structure, in the traveling direction of the vehicle. It serves to accommodate one of the side panel structures as well as the frame rail located upstream from the bulkhead or a wheel suspension strut. To the extent facing the frame rail section, i.e., in the traveling direction, pointing toward the front, the linking component exhibits an attachment profile corresponding with the profile cross section of the frame rail section. The linking component acts as a kind of attachment for securing the frame rail to the side panel structure, in particular to a hinge pillar and/or its reinforcing plate.

A frame rail known from prior art and referred to as a wheel suspension strut, for example, is divided into two components viewed in the longitudinal direction of the vehicle, wherein the linking component taking up the primary frame rail profile can be secured separately and in advance to the side panel structure and/or the bulkhead structure of the motor vehicle body. Since the linking component only projects in front of the bulkhead to only a comparatively slight extent viewed in the traveling direction, the latter can be easily secured separately to the adjoining bearing structure components of the side panel structure in the vicinity of its attachment profile accessible from the front. After the linking component provided for separately accommodating the frame rail section has been assembled and secured to the side panel structure, the frame rail section can be secured to the side panel structure by means of the linking component in a second attachment step, for example via spot welding.

In an embodiment, the attachment profile of the linking component in a final assembly position here at least regionally overlaps the frame rail section to be attached to the linking component. The linking component here preferably exhibits a cross sectional profile with an essentially closed configuration in relation to the vertical and transverse direction of the vehicle. It is provided in the final assembly position that the frame rail section is joined with both the respective upper and lower, as well as lateral, in particular inner and outer, profile sections of the linking component.

Another embodiment further provides that an outer side panel of the linking component comes to rest on the outside of the side panel structure. In this regard, the linking component can cover the outside of the side panel, in particular the outside of the hinge pillar, or a hinge pillar reinforcement, and be secured with the hinge pillar so as to overlap it. It can here be provided in particular that the side panel of the linking component, which projects like a flange toward the rear, opposite the traveling direction, exhibit a structural reinforcement, for example in the form of a fluting, or in the form of reinforcing ribs or webs.

A structurally reinforced side panel section that comes to overlap and rest against the hinge pillar allows the linking component to abut the hinge pillar or side panel structure of the vehicle body over a comparatively large surface, so that any mechanical loads directed inwardly toward the middle of the vehicle can be diverted into the side panel structure over as large a surface as possible.

Another embodiment also provides that the inner side panel of the linking component comes to rest against a lateral section of the bulkhead of the vehicle body. The lateral bulkhead section here represents an outer boundary of the vehicle bulkhead lying in the transverse direction of the vehicle. Because the linking component with its attachment profile, viewed in the transverse direction of the vehicle, comes to rest on the outside of the hinge pillar with its outer side panel section on the one hand, and also on a lateral section of the bulkhead with its inner side panel section on the other, the linking component represents a quasi-forwardly directed elongation of the hinge pillar, which is provided in particular for accommodating and attaching the frame carrier section located upstream from the bulkhead and hinge pillar.

Another embodiment provides that the linking component exhibits a bottom, roughly concavely curved lower portion, a rear section of which nestles against the side panel structure. It is here further provided that the lower portion that lies opposite, meaning extends toward the front in the traveling direction, protrudes from at least one lateral attachment profile section of the linking component adjacent thereto. This type of projection by the lower and/or inner profile section of the attachment profile of the linking component makes it possible to subsequently link the frame rail section thereto in an especially easy and rational way. The roughly concavely curved lower portion of the attachment profile of the linking component can also fill the entire transition curve between the essentially horizontally running frame rail section and the essentially vertically aligned hinge column as nearly a single piece.

In another embodiment, the lower portion and inner side panel of the attachment profile of the linking component are designed as a one-piece bottom shell of the attachment profile. In addition or as an alternative to the above, the attachment profile of the linking component can similarly also exhibit a one-piece top shell, which exhibits an upper profile section, specifically a upper portion and an outer side panel section of the attachment profile for the frame rail correspondingly designed hereto.

It can here be provided in particular that the top shell be furnished with a Z-shaped upper linking flange lying in the plane formed by the longitudinal direction of the vehicle (x) and transverse direction of the vehicle (y). This upper limiting flange of the linking component can be one-piece, emptying into both an outer side panel and an inner side panel of the linking component. The outer and inner side panel of the top shell are aligned essentially parallel to each other, and can lie in roughly the plane formed by the vertical direction of the vehicle (z) and longitudinal direction of the vehicle (x).

In another embodiment, the lower portion of the linking component and/or its side panel section of the attachment profile can exhibit at least one opening for passing through a fastening tool, in particular a welding tool. The openings can be used to secure the linking component to the side panel structure itself, as well as to thereafter secure the frame rail section to the linking component. The frame rail section can here be made largely open and free of openings, so that its structural integrity can be largely maintained even when using a spot welding process.

In this regard, a further development provides in particular that the linking component can be secured to the side panel structure and/or bulkhead via spot welding prior to assembling the frame rail. In a manufacturing step subsequent hereto, the frame rail can similarly be secured via spot welding to the linking component, side panel structure and/or bulkhead structure. It is advantageous in this regard that the holes in the frame rail previously required for spot welding need not be provided.

In addition, such openings provided for the welding process no longer have to be separately sealed. The openings in the linking component to be provided for the welding tool further preferably come to lie in an area where an opening is furnished in the lateral bulkhead structure anyway for draining a radiator tank adjoining the latter.

A further embodiment additionally provides that the frame rail section exhibit a two-part cross sectional profile, in particular one having an inner profile section and an outer profile section. The inner profile section and outer profile section can here be secured one after the other to the side panel structure or linking component, accompanied by the formation of a closed cross sectional profile.

The inner profile section here preferably corresponds with the bottom shell of the linking component, while the outer profile section of the frame rail is configured based on the top shell of the linking component. Mutually corresponding flange sections that respectively extend in the longitudinal direction of the profile, abut each other in the profile direction and can consequently be spot welded to each other are provided in the transitional area between the top shell and bottom shell of the linking component, as well as in the transitional area between the inner and outer profile section of the frame rail.

It is advantageous if the frame rail section that can be secured to the side panel structure by means of the linking component exhibit a structure that is outwardly completely closed. This means that the frame rail extending from the bulkhead or hinge pillar toward the front, in the traveling direction, can be fabricated without openings to be provided for spot welding, which of course increases and improves the structural integrity and stability of such a frame rail, along with its torsional rigidity.

Another embodiment provides for a motor vehicle that exhibits at least one bearing structure arrangement described above in the transitional area between the bulkhead, hinge pillar and forward-protruding frame rail. Finally, another embodiment provides a method for assembling a bearing structure arrangement of a motor vehicle. A linking component described above is secured to a side panel structure of the motor vehicle body. After the linking component separately provided for accommodating or securing a frame rail located upstream from the bulkhead has been attached, an inner profile section of the frame rail is secured thereto, before an outer profile section of the frame rail is attached to the inner frame rail section and linking component in another step. In particular a spot welding process can be used for all mutual attachments of the mentioned components, wherein individual welding spots can be sufficiently accessed through openings provided in the linking component.

BRIEF DESCRIPTION OF FIGURES

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

The bearing structure arrangement 10 shown on FIG. 1 to FIG. 9 exhibits a side panel structure that comprises a door opening or door opening frame, and has an A-column 12 adjoined from below by a hinge pillar 14. As depicted in detail on FIG. 2, the hinge pillar 14 can also be provided with a reinforcing profile 16, so as to improve a structural linkage between the hinge pillar 14 and a bulkhead 36 that is shown on FIG. 4 and FIG. 5, and essentially extends in the transverse direction of the vehicle (y).

Figure 5:
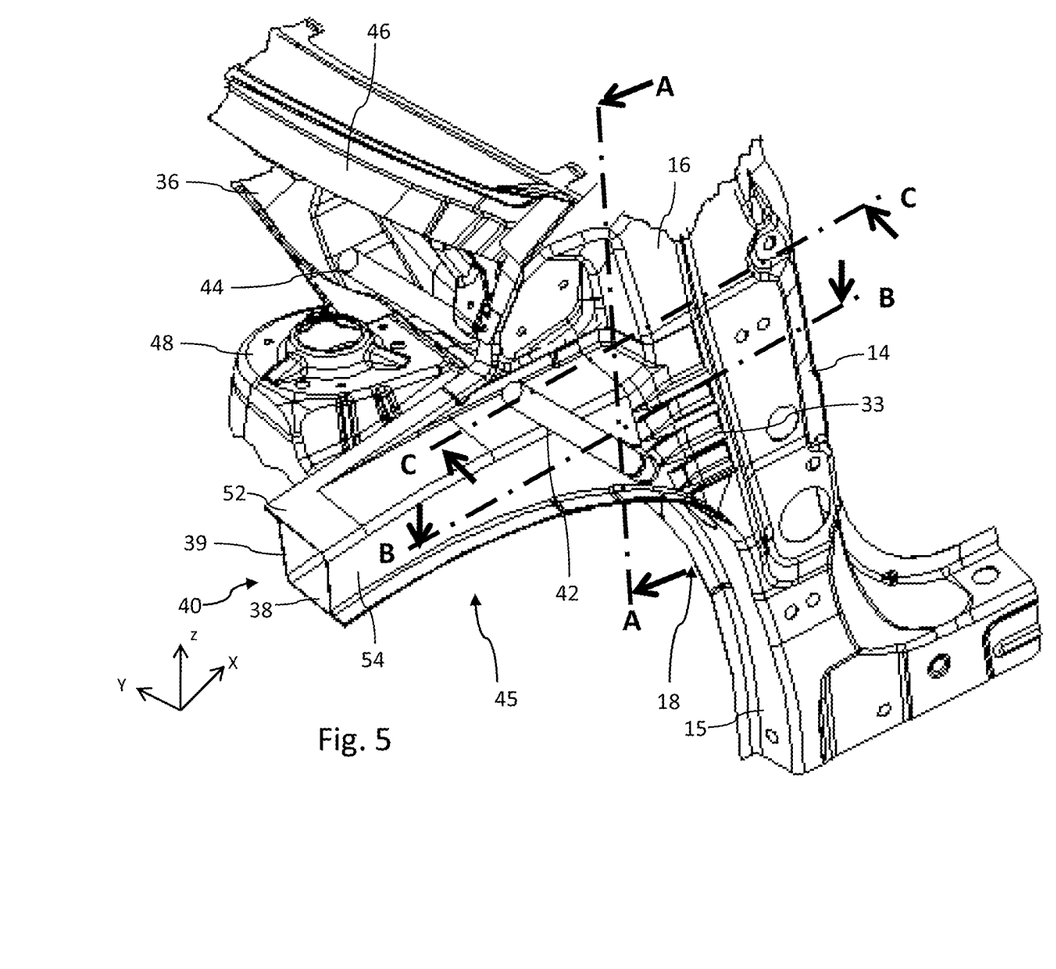
FIG. 5 is another perspective view of the bearing structure arrangement with a front frame rail completely secured thereto.
Figure 6:
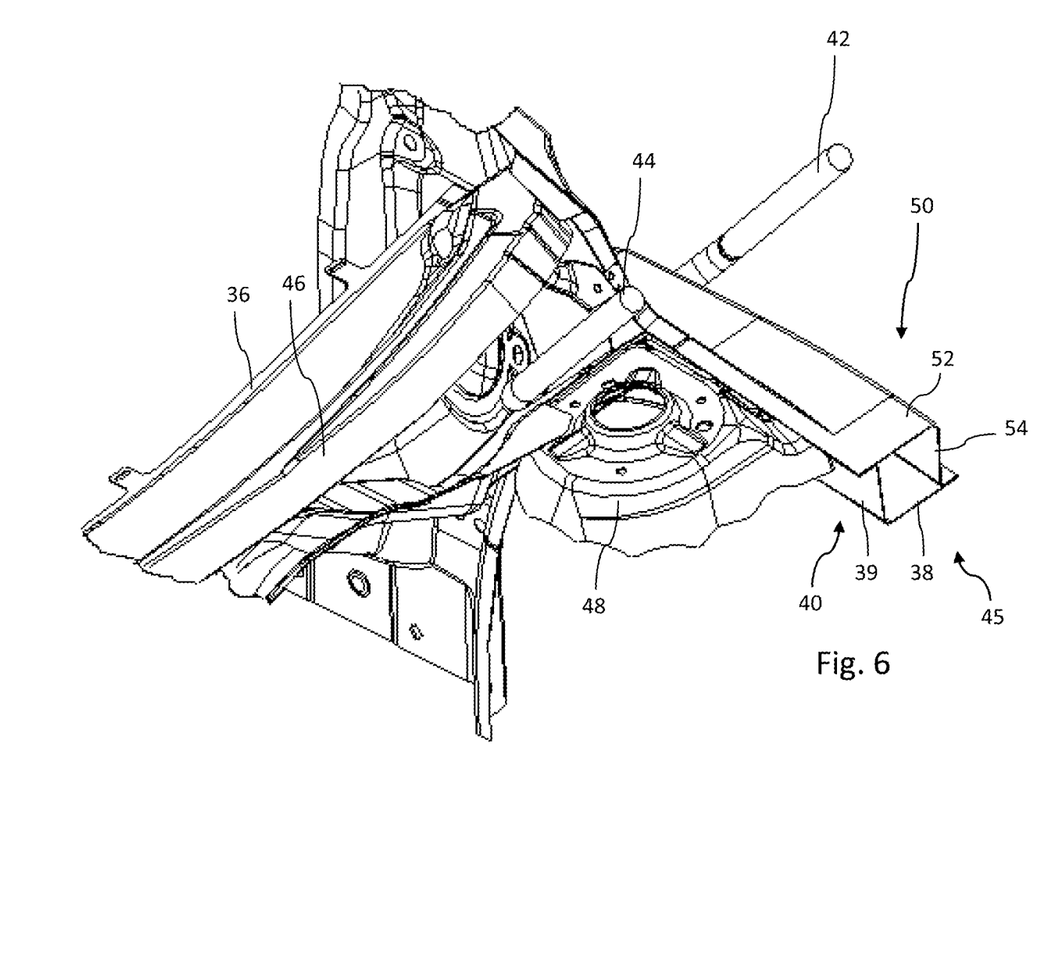
FIG. 6 is another perspective view of the bearing structure arrangement as seen from the engine compartment.

Provided for securing a frame rail 45 shown on FIG. 5 and generally labeled as a wheel suspension strut is a separate linking component 18, which must be separately attached to the side panel structure 14, 16 before assembling the frame rail 45. The linking component 18 shown in isolation on FIG. 1 exhibits an attachment profile comprised of a top shell 22 and bottom shell 20, with a lower portion 24, an inner side panel 26, an upper portion 28 and an outer side panel 30.

The inner side panel 26 and lower portion 24 here resemble an L-shaped profile section, configured in a single piece as a bottom shell 20, while the top shell 22 correspondingly thereto exhibits the outer side panel 30 and upper portion 28, which are also joined together as one piece or fabricated out of a single sheet metal part. In addition to the outer side panel 30 and upper portion 28, the embodiment of the top shell 22 presented on FIG. 1 and the remaining figures also exhibits an upper linking flange 29 extending nearly perpendicular to the upper portion 28 and outer side panel 30. The linking component 18 can use this flange 29 to support itself on the hinge pillar 14 opposite the traveling direction denoted on FIG. 2 with an arrow pointing to the left, in particular on a front profile section 15 pointing in the traveling direction.

In an installation situation of the kind shown on FIG. 2 to FIG. 5, for example, a side panel section 31 projecting from a crosspiece 29 of the linking flange opposite the traveling direction toward the back comes to overlap or cover the hinge pillar 14. This projection 31 of the outer side panel 30 protruding toward the back also incorporates individual reinforcing ribs 33, which serve in particular for accommodating and transferring transverse forces between the frame rail 45 abutting the attachment profile 24, 26, 28, 30 and secured hereto and the adjoining hinge pillar 14.

An embossment or material recess 25 is provided on the top shell 22 on the opposite side, inwardly in the transverse direction of the vehicle (y), offset relative to the outer side panel 30. The side panel section 26 in conjunction with the material recess 25 doubles the material for a vertical welding flange of the reinforcement 16 of the hinge pillar 14, and hence doubles the material with the lateral bulkhead, or with the side panel structure, as may be gleaned from the combined view of FIG. 1 and FIG. 8 on FIG. 8. The drainage hole 32 in the lateral bulkhead 16 can here be provided with an additional bracing.

Figure 1:
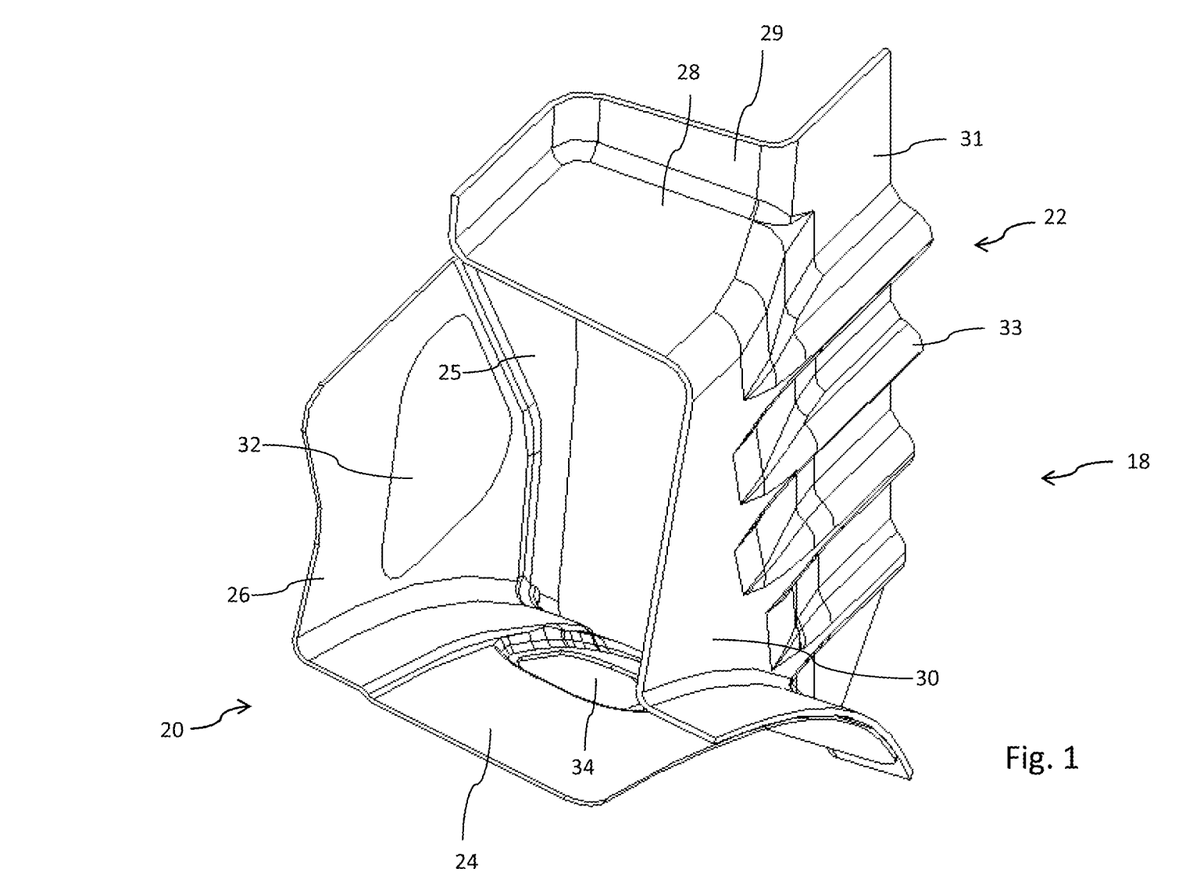
FIG. 1 is a perspective and isolated view of a linking component.
Figure 2:
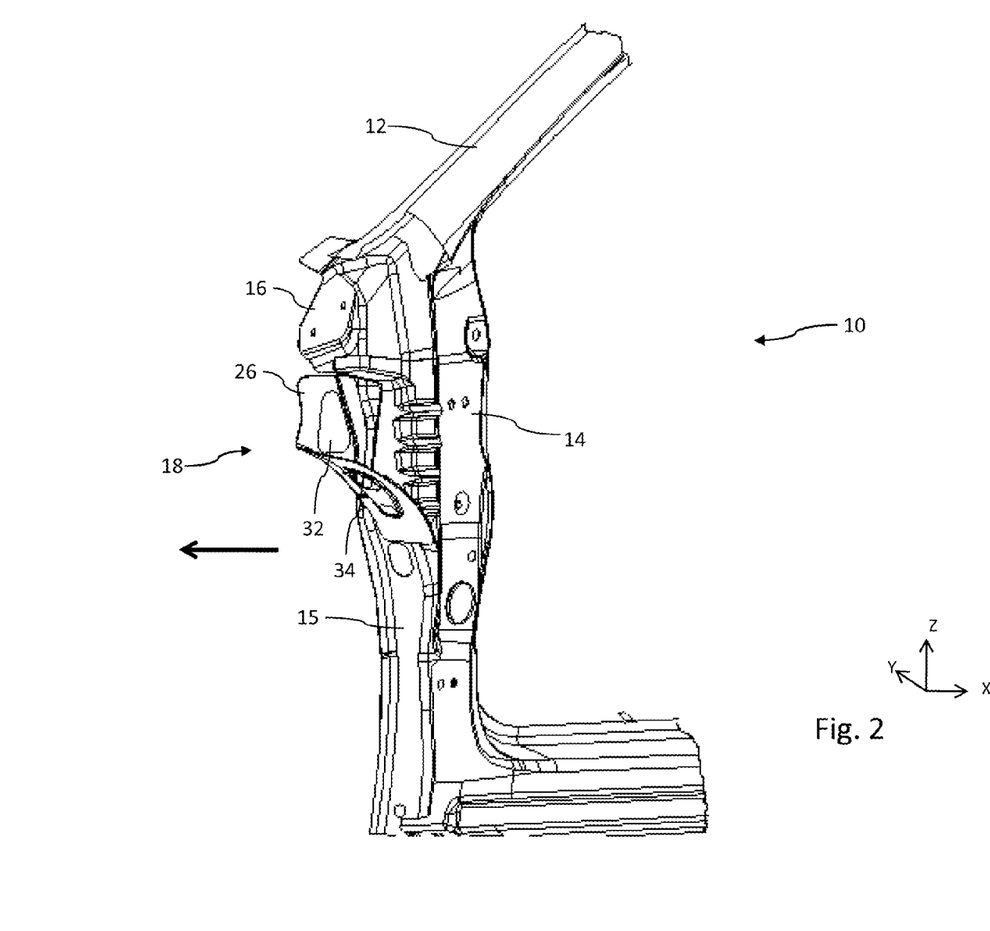
FIG. 2 is a perspective, slanted front view of a linking component secured to a hinge pillar.
Figure 3:
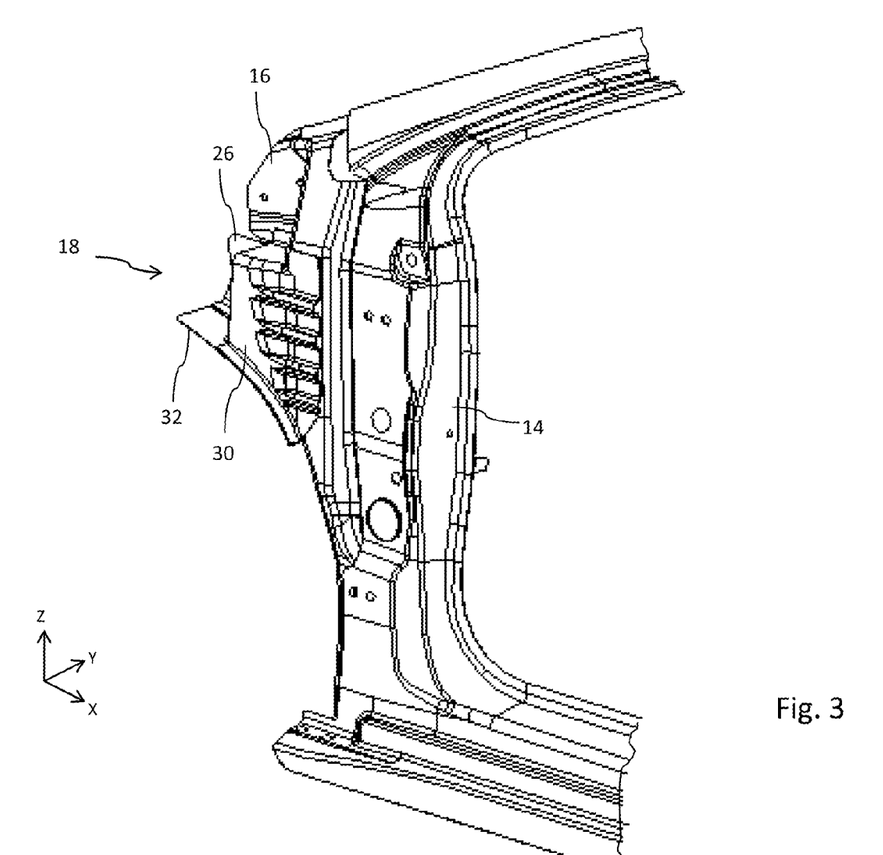
FIG. 3 is a perspective, slanted rear view of the bearing structure arrangement according to FIG. 2.

As further discernible from FIG. 1, the bottom shell 20, with its roughly L-shaped side panel section 26 and lower portion 24, projects at least slightly from the top shell 22 and its outer side panel 30 and its upper portion 28, pointing in the traveling direction. From the standpoint of assembly technology, the frame rail 45 can be secured to the linking component 18 in two consecutive attachment steps. An inner profile section 40 of the frame rail 45 corresponding with the bottom shell 20 is preferably to be secured to the linking component 18 first. The elongation of the bottom shell 20 of the linking component 18 directed toward the front can here prove advantageous. For example, FIG. 4 depicts such an intermediate stage in the assembly of the frame rail.

As further discernible from FIG. 1, both the inner side panel 26 and the lower portion 24 of the bottom shell 20 are each provided with an opening 32, 34, so that water accumulating in the adjoining radiator tank can drain away on the one hand, and open up access on either side for mutually corresponding welding tools 42, 44 to be used in a spot welding process on the other. For example, FIG. 4 uses individual spots to denote the welding of the inner panel 26 of the linking component 18 with the lateral structure of a bulkhead 36 adjoining the hinge pillar 14. Since only an inner profile section 40 of the frame rail 45 is provided in the final assembly position, the inner side panel 26 of the linking component 18 and the side panel 39 of the inner frame rail section 40 can be easily secured to adjoining structural components of the motor vehicle body by means of spot welding.

Figure 4:
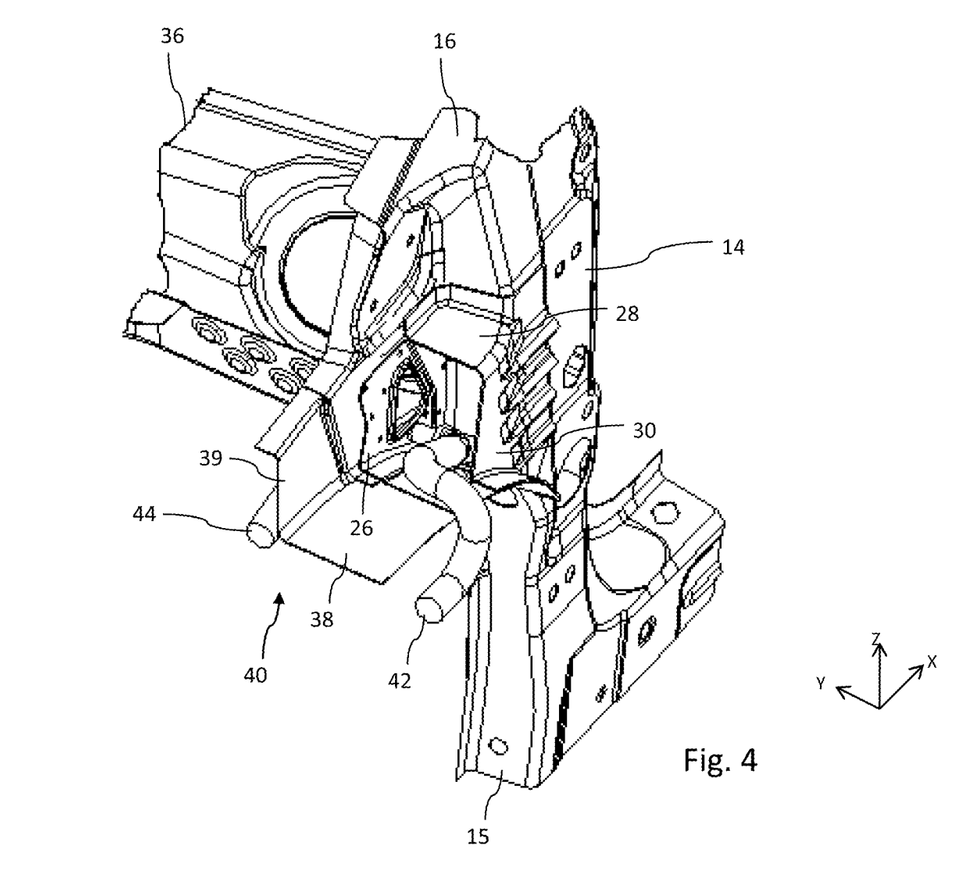
FIG. 4 is the bearing structure arrangement according to FIGS. 2 and 3, with an inner profile section of a frame rail secured thereto.

Comprised of three stages in all, the assembly process for the frame rail 45 located upstream from the bulkhead 36 initially provides that the linking component or attachment 18 be separately secured to the side panel structure 14, 16, after which an inner profile section 40 of the frame rail 45 be welded with the linking component 18 in a second step, as exemplarily depicted on FIG. 4. This is followed by the attachment of an outer profile section 50 of the frame rail 45 located upstream from the side panel structure 12, 14, 16 correspondingly designed relative to the inner profile section 40, e.g., as denoted on FIG. 5. All mentioned components can here advantageously be attached successively to the body via spot welding. The respective mutually corresponding profile sections 40, 50 comprising the frame rail 45 each exhibit regionally overlapping flange sections running in the longitudinal profile direction, which can be easily welded together from outside or above. Also shown on FIG. 5 is a pane support 46 for a front windshield, as well as a McPherson strut mount 48 arranged on the frame rail 45, adjoining from inside. Openings 34 for welding tools 42, 44 are provided in the linking component 18 in order to secure the frame rail 25 45 to the linking component 18.

Figure 7:
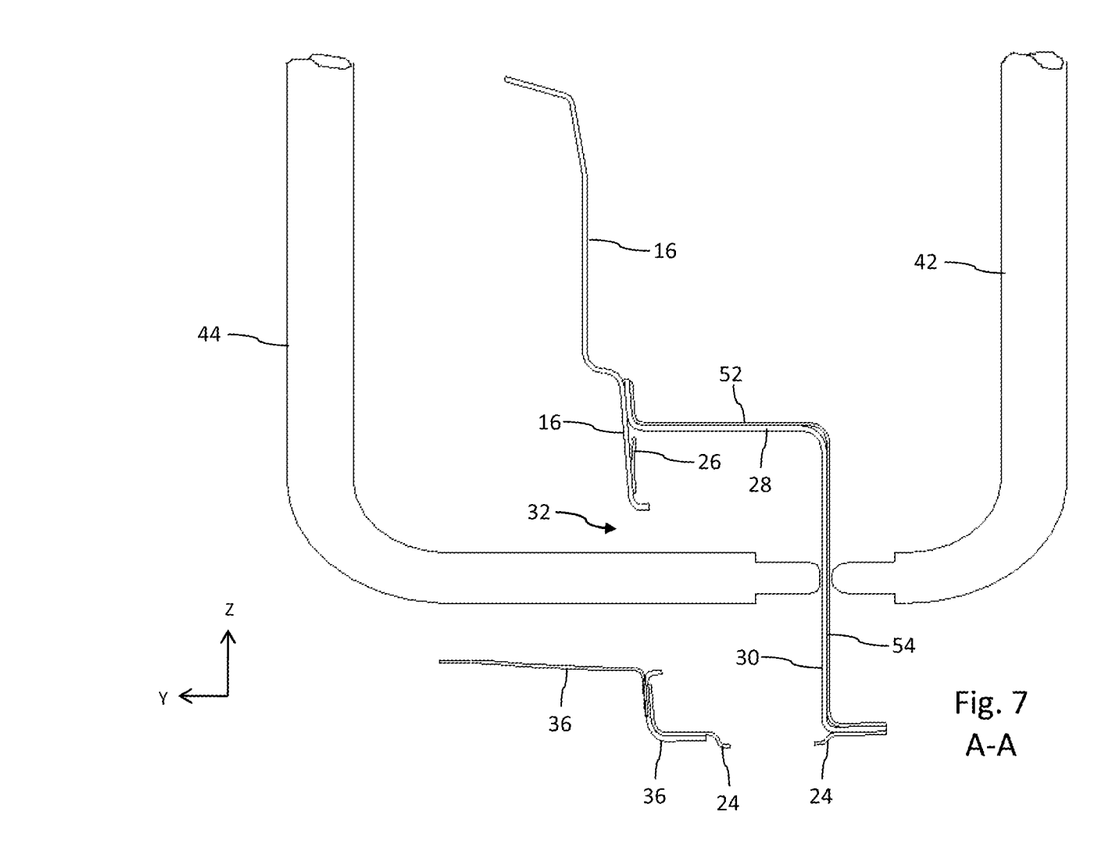
FIG. 7 is a cross section along line A-A according to FIG. 5.

The outer profile section 50 of the frame rail 45 exhibits a lateral portion 54 and an upper portion 52, which in the final assembly position as denoted on FIG. 7 come to cover nearly all of the corresponding profile sections 30, 28 of the attachment profile of the linking component 18. For example, a welding tool 44 can be introduced from inside through the opening 32 formed in the inner side panel 26 into the frame rail profile, so that a spot weld can be created in conjunction with an opposing welding tool 42 corresponding thereto in the region where the two lateral portions 30, 54 overlap.

The upper portion 52 of the outer profile section 50 of the frame rail 45 can also be structurally connected with the upper portion 28 of the linking component 18 in a similar manner. For example, the welding tool 44 can here be guided from inside through the opening 34 formed in the lower portion 24 of the linking component 18 to a corresponding region where the two upper portions 28, 52 overlap, for example as depicted on FIG. 9.

Figure 8:
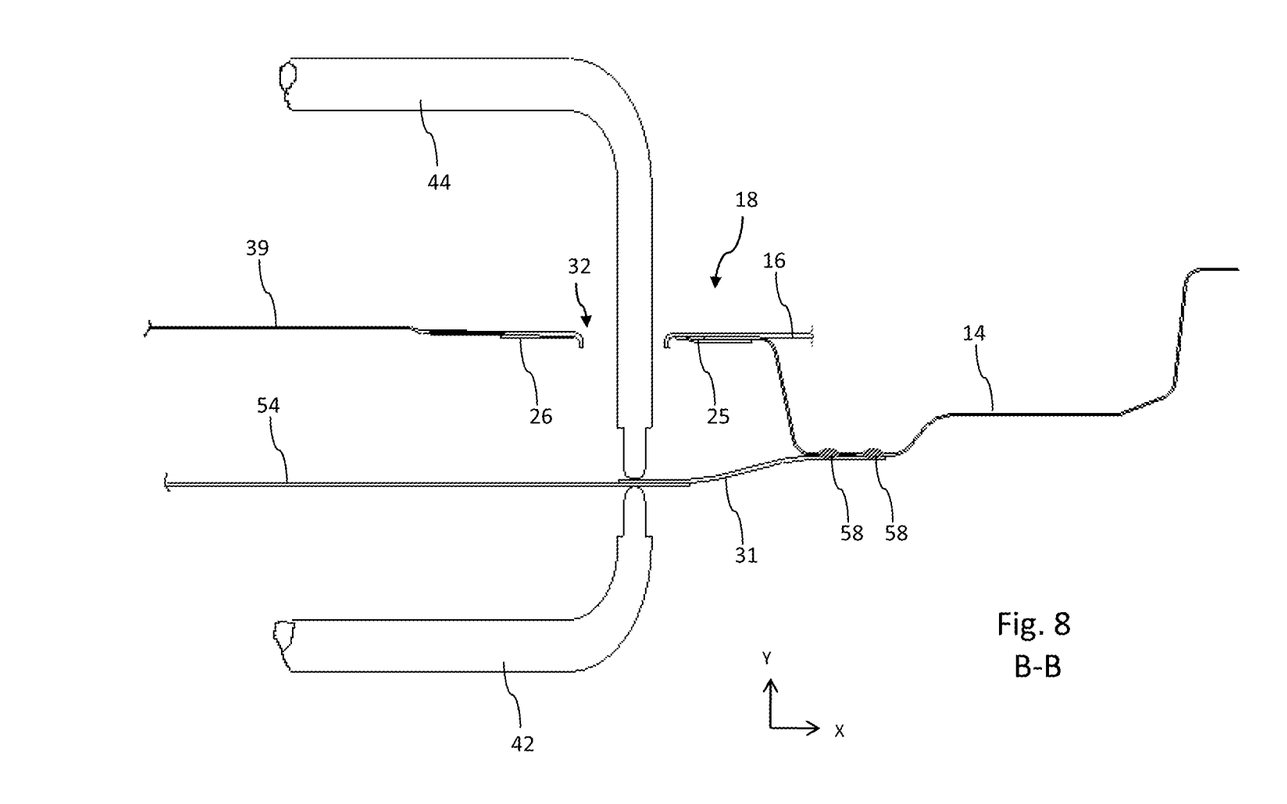
FIG. 8 is a cross section along B-B according to FIG. 5.

As may further be gleaned from FIG. 8, which shows a cross section along B-B according to FIG. 5, the linking component 18 with its outlying side panel section 31 that extends in the longitudinal direction of the vehicle (x) ends up overlapping the outside of the hinge pillar 14, where it is secured by means of two spot welds 58

Figure 9:
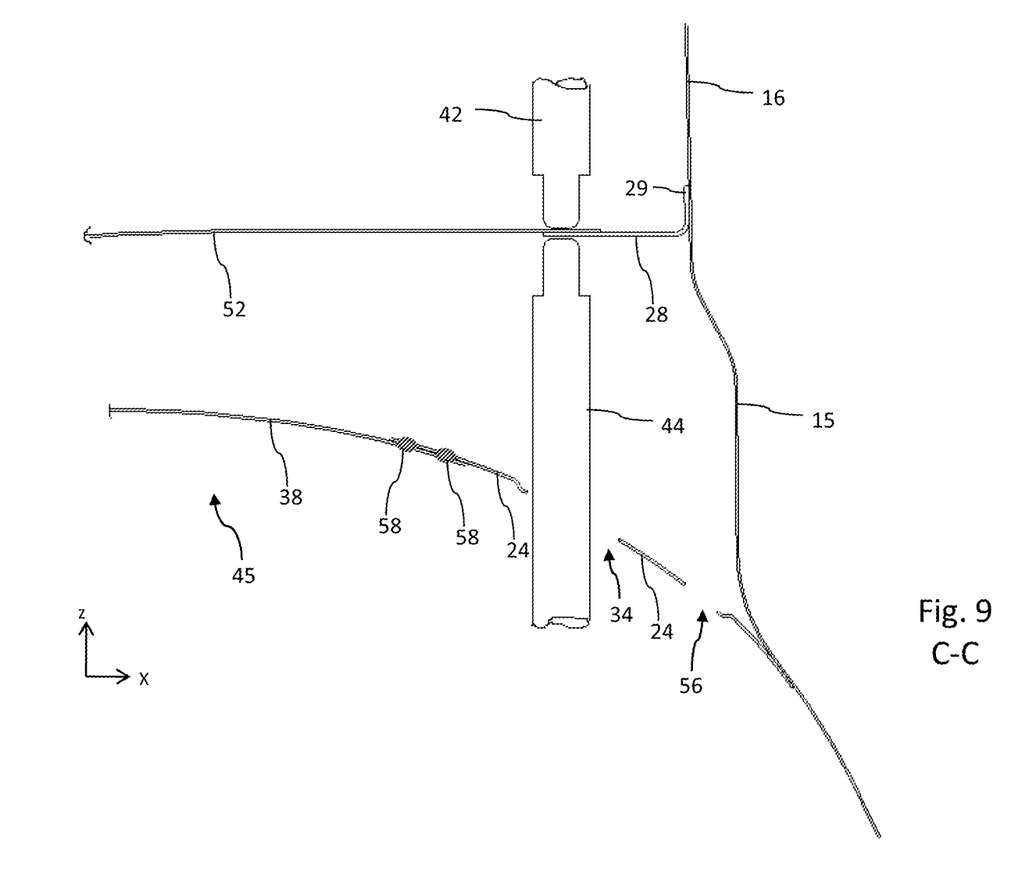
FIG. 9 is a cross section along C-C according to FIG. 5.

Also shown on FIG. 9 is the upper attachment flange 29 of the linking component 18, with which the linking component 18 can downwardly support itself against a front profile section 15 of the hinge pillar 14 facing the traveling direction, which is depicted on FIG. 5. FIG. 9 further presents the coverage of the mutually corresponding profile sections 38, 24 by the inner profile section 40 of the frame rail 45 with the lower portion 24 of the linking component 18 correspondingly designed hereto. For example, this region is provided with two additional weld spots 58, which are easily accessible during the assembly process, since the outer profile section 50 of the frame rail 45 is only secured to the linking component 18 at a later point. Also shown on FIG. 9 is another through hole 56, which likewise can be used to drain off water and/or provide access for a welding tool.

Subdividing a front frame rail 45 generally referred to as a wheel suspension strut into a frame rail section and a linking component 18 provided with a corresponding profile cross section makes it possible overall to create a structural node that enables an improved introduction of mechanical loads into the body structure, in particular if the vehicle suffers a side impact offset in the longitudinal direction, can be universally assembled via spot welding, and in this respect is inexpensive to manufacture and comparatively easy to assemble.

Aside from the improved structural properties, especially with regard to stability and torsional rigidity, in particular the essentially closed structure of the frame rail also enables the fabrication of the latter using comparatively thin-walled sheet metal, so that the overall vehicle weight can be reduced.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A bearing structure arrangement of a motor vehicle body, comprising:
   a bulkhead;
   a side panel structure that adjoins the bulkhead;
   a linking component comprising:
     a bottom shell formed by an inner side panel and a lower portion, the inner side panel secured to the side panel structure; and
     a top shell formed by an outer side panel and an upper portion, secured to the side panel structure; and
   a frame rail section comprising:
     an outer profile section; and
     an inner profile section, wherein the outer profile section and the inner profile section each exhibit regionally overlapping flange sections running in a longitudinal profile direction,
   wherein the linking component facing the frame rail section comprises an attachment profile corresponding with a profile cross section of the frame rail section in which the outer profile section of the frame rail section overlaps the top shell of the linking component and the inner profile section of the frame rail section overlaps the bottom shell of the linking component.

2. The bearing structure arrangement according to claim 1, wherein the attachment profile of the linking component that is secured to the side panel structure in a final assembly position is configured to at least regionally overlap the frame rail section.

3. The bearing structure arrangement according to claim 1, wherein the outer side panel of the linking component comprises individual reinforcement ribs, and the outer side panel is configured to rest on the outside of the side panel structure.

4. The bearing structure arrangement according to claim 1, wherein the inner side panel of the linking component is configured to rest against a lateral section of the bulkhead.

5. The bearing structure arrangement according to claim 1, wherein the linking component comprises a concavely curved lower portion and a rear section that nestles against the side panel structure, and the linking component is configured with an opposing attachment section that projects from adjoining profile sections in the traveling direction and configured to accommodate the frame rail section.

6. The bearing structure arrangement according to claim 3, wherein the top shell of the linking component is a one-piece top shell which is furnished with a Z-shaped upper linking flange leading into the outer side panel of the top shell and leading into the inner side panel of the bottom shell.

7. The bearing structure arrangement according to claim 1, wherein the lower portion of the linking component comprises at least one opening for passing through a fastening tool.

8. The bearing structure arrangement according to claim 4, the inner side panel comprises an opening configured to pass through a fastening tool.

9. The bearing structure arrangement according to claim 1, wherein the linking component is securable to the side panel structure via spot welding before assembling the frame rail section.

10. The bearing structure arrangement according to claim 1, wherein the frame rail section is securable to the side panel structure and forms a closed cross sectional profile.

11. The bearing structure arrangement according to claim 1, wherein the frame rail section comprises an outwardly and at least substantially closed structure.

12. A method for assembling a bearing structure arrangement of a motor vehicle, comprising:
   securing a linking component to a side panel structure of a motor vehicle body that adjoins a bulkhead, wherein the linking component comprises an inner side panel, a lower portion, an outer side panel, an upper portion, a first opening formed in the inner side panel, and a second opening formed in the lower portion;
   after securing inner and outer side panels of the linking component to the side panel structure, securing an inner profile section of a frame rail section to the linking component, by welding a side panel of the inner profile section to the inner side panel of the linking component, and by welding a bottom panel of the inner profile section to the lower portion of the linking component; and
   after securing the inner profile section of the frame rail section to the linking component, securing an outer profile section of the frame rail section to the inner profile section of the frame rail section and to the linking component, by:
      introducing a welding tool through the second opening formed in the lower portion;
      welding an upper portion of the outer profile section to the upper portion of the linking component using the welding tool in the second opening;
      introducing a welding tool through the first opening formed in the inner side panel;
      welding a lateral portion of the outer profile section to the outer side panel of the linking component; and
      welding longitudinal flanges of the inner profile section and the outer profile section together.

13. The method according to claim 12, further comprising spot welding the linking component.

14. The method according to claim 12, further comprising spot welding the frame rail section.

* * * * *